US008233452B2

(12) United States Patent
Makhijani et al.

(10) Patent No.: US 8,233,452 B2
(45) Date of Patent: Jul. 31, 2012

(54) SIGNALING TRANSMISSION ON SHARED AND DEDICATED CHANNELS IN A WIRELESS COMMUNICATION SYSTEM

(75) Inventors: Mahesh Makhijani, San Diego, CA (US); Yavuz Mehmet, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 12/210,828

(22) Filed: Sep. 15, 2008

(65) Prior Publication Data

US 2009/0075666 A1 Mar. 19, 2009

Related U.S. Application Data

(60) Provisional application No. 60/973,378, filed on Sep. 18, 2007.

(51) Int. Cl.
*H04W 4/00* (2009.01)
(52) U.S. Cl. ........................................ 370/331; 455/450
(58) Field of Classification Search .......... 370/331–334; 455/450
See application file for complete search history.

(56) References Cited

U.S. PATENT DOCUMENTS

| 7,010,317 | B2 * | 3/2006 | Hwang et al. | 455/522 |
|---|---|---|---|---|
| 7,088,700 | B2 * | 8/2006 | Lee et al. | 370/342 |
| 7,197,021 | B2 * | 3/2007 | Seo et al. | 370/335 |
| 7,283,495 | B2 | 10/2007 | Lee et al. | |
| 2006/0104229 | A1 | 5/2006 | Vannithamby | |
| 2007/0049308 | A1 | 3/2007 | Lindoff et al. | |

FOREIGN PATENT DOCUMENTS

| CN | 1960562 A | 5/2007 |
|---|---|---|
| WO | WO02067606 A2 | 8/2002 |
| WO | WO2006055113 A1 | 5/2006 |
| WO | WO2006125472 A1 | 11/2006 |
| WO | WO2007039361 A1 | 4/2007 |
| WO | WO2007070460 A2 | 6/2007 |
| WO | WO2007091482 A1 | 8/2007 |

OTHER PUBLICATIONS

Holma, Harri; et al. "WCDMA for UMTS: Radio Access for Third Generation Mobile Communications" Wiley and Sons, GB, 2004, pp. 99-184, XP002517478, sections 6.2.2, 6.2.2.2, 6.2.2.6; sections 6.4.5, 6.4.7, 6.4.8; section 7.3.3; section 7.8.

International Search Report and Written Opinion—PCT/US08/076730, International Searching Authority—European Patent Office, Mar. 13, 2009.

(Continued)

*Primary Examiner* — Phuc Tran
(74) *Attorney, Agent, or Firm* — Charles Chesney

(57) ABSTRACT

Techniques for sending and receiving signaling messages on shared and dedicated channels in a wireless communication system are described. A user equipment (UE) may receive a first signaling message on a shared channel during a first time period, receive a second signaling message on a dedicated channel during a second time period, and receive a third signaling message on the shared channel during a third time period. The UE may receive traffic data on the shared channel during all time periods. The UE may be handed over from a source Node B to a target Node B during the second time period. The UE may receive the first signaling message via the source Node B, receive the second signaling message via the source and target Node Bs, and receive the third signaling message via the target Node B.

27 Claims, 7 Drawing Sheets

OTHER PUBLICATIONS

"Universal Mobile Telecommunications System (UMTS); Interlayer procedures in Connected Mode (3GPP TS 25.203 version 6.3.0 Release 6); ETSI TS 125 303" ETSI Standards, Lis, Sophia Antipolis Cedex, France, vol. 3-R2, No. V6.3.0, Jun. 1, 2005, XP014030556, p. 30, line 1—p. 33, line 34.

Taiwan Search Report—TW097135807—TIPO—Mar. 19, 2012.

* cited by examiner

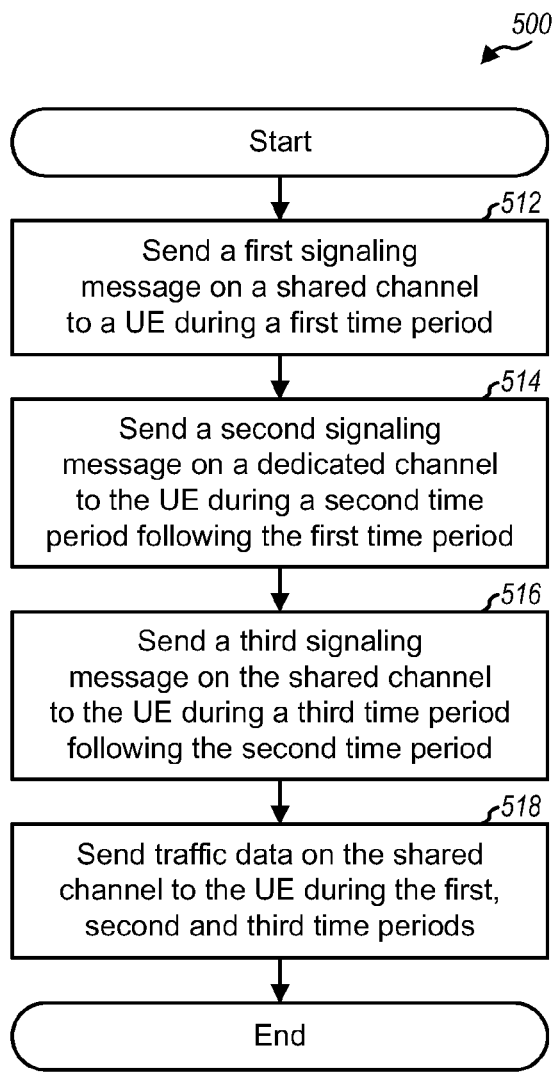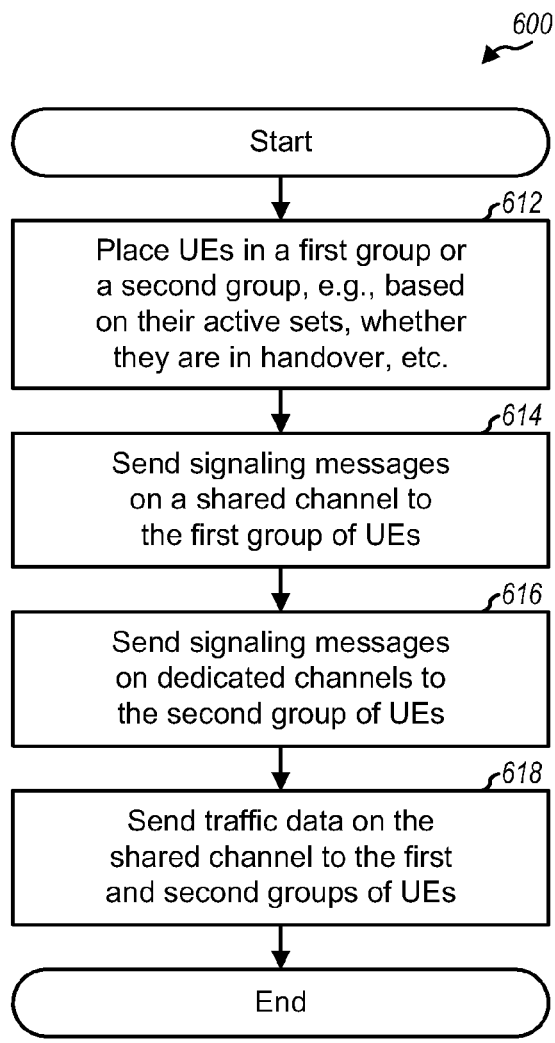
FIG. 5
FIG. 6

SIGNALING TRANSMISSION ON SHARED AND DEDICATED CHANNELS IN A WIRELESS COMMUNICATION SYSTEM

The present application claims priority to provisional U.S. Application Ser. No. 60/973,378, entitled "METHOD TO ENABLE DEDICATED VS. HS CHANNEL FOR SIGNALING SRB'S IN HSPA NETWORKS," filed Sep. 18, 2007, assigned to the assignee hereof and incorporated herein by reference.

BACKGROUND

I. Field

The present disclosure relates generally to communication, and more specifically to techniques for sending signaling messages in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a user equipment (UE) may actively communicate with one Node B at any given moment. The UE may be mobile and may move out of the coverage of a first Node B and into the coverage of a second Node B. The UE may exchange signaling messages via the first Node B and/or the second Node B to perform handover from the first Node B to the second Node B. The channel conditions may change rapidly during the handover. It may be desirable to exchange the signaling messages in a reliable manner in order to ensure successful handover.

SUMMARY

Techniques for sending and receiving signaling messages on shared and dedicated channels in a wireless communication system are described herein. A shared channel is a channel that is received by multiple UEs. Data for these UEs may be multiplexed on the shared channel using various multiplexing schemes. The shared channel may be sent by a single Node B to the UEs, which may improve resource utilization. A dedicated channel is a channel that is received by a single UE. The dedicated channel may be sent by multiple Node Bs to the UE, which may improve reliability.

In an aspect, signaling messages may be sent on a shared channel to a UE whenever possible and on a dedicated channel whenever greater reliability is desired. In one design, a first signaling message may be sent on the shared channel to the UE during a first time period. A second signaling message may be sent on the dedicated channel to the UE during a second time period following the first time period. A third signaling message may be sent on the shared channel to the UE during a third time period following the second time period. Traffic data may be sent on the shared channel to the UE during the first, second and third time periods. In one design, the UE may be handed over from a source Node B to a target Node B during the second time period. The first signaling message may be sent via the source Node B to the UE. The second signaling message may be sent via both the source and target Node Bs to the UE. The third signaling message may be sent via the target Node B to the UE. The dedicated channel may be assigned to the UE prior to the handover and may be released after the handover. The shared channel may be used to send signaling messages to the UE after releasing the dedicated channel.

The shared channel or dedicated channel may be selected for the UE based on various criteria. In one design, the shared channel may be selected when an active set of the UE includes a single cell, and the dedicated channel may be selected when the active set includes multiple cells. In another design, the shared channel may be used prior to and after handover, and the dedicated channel may be used during handover. In yet another design, the dedicated channel may be used to send certain signaling messages deemed more important, and the shared channel may be used to send remaining signaling messages. In yet another design, the shared channel may be selected if it is deemed sufficiently reliable, and the dedicated channel may be selected otherwise.

Various aspects and features of the disclosure are described in further detail below.

BRIEF DESCRIPTION OF THE DRAWINGS

FIG. 5 shows a process for sending signaling messages to a UE.

FIG. 6 shows a process for sending signaling messages to two groups of UEs.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for WCDMA, and 3GPP terminology is used in much of the description below.

Figure 1:
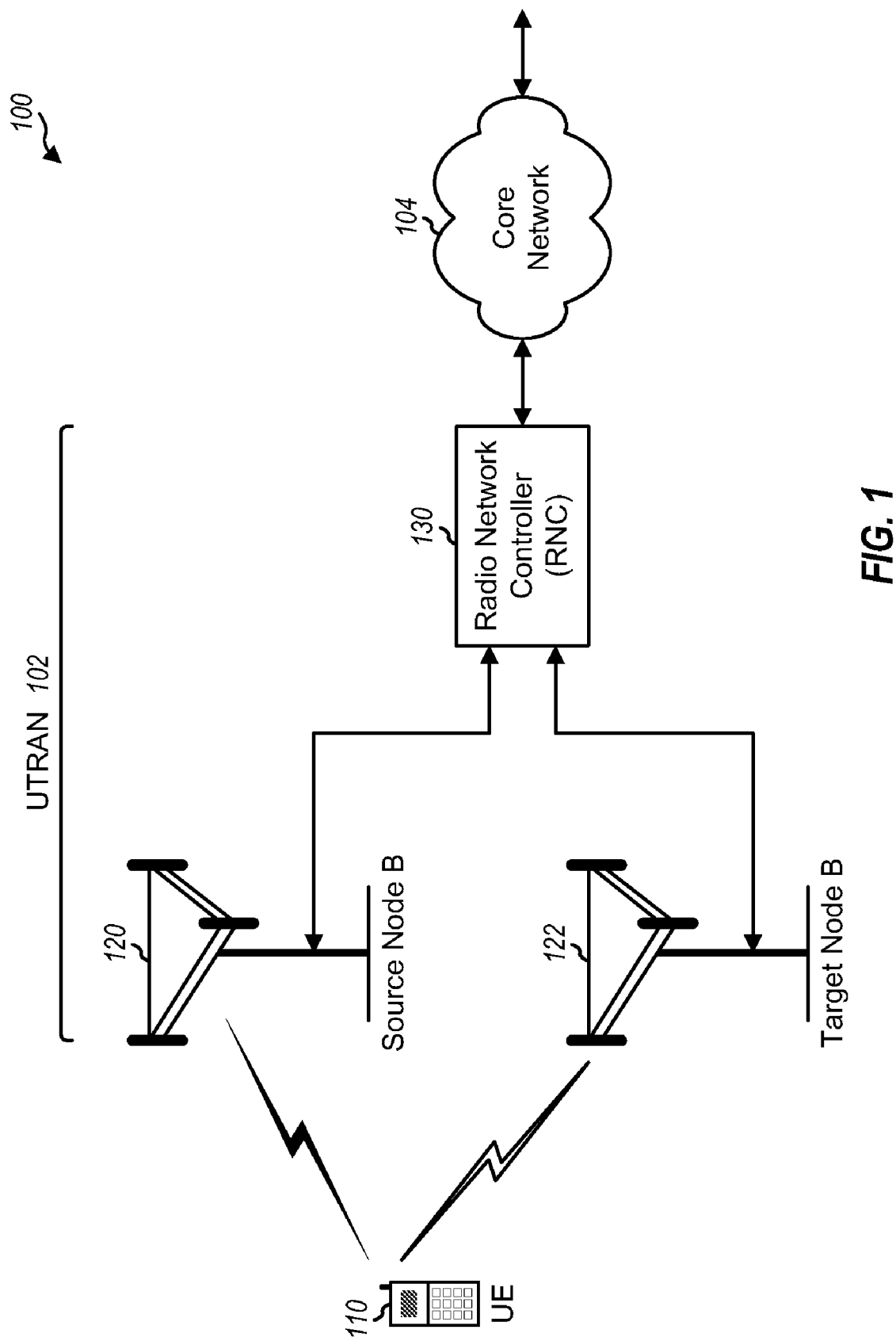
FIG. 1 shows a wireless communication system.

FIG. 1 shows a wireless communication system 100, which includes a Universal Terrestrial Radio Access Network (UTRAN) 102 and a core network 104. UTRAN 102 may include any number of Node Bs and other network entities. For simplicity, only two Node Bs 120 and 122 and one Radio Network Controller (RNC) 130 are shown in FIG. 1 for UTRAN 102. A Node B is a fixed station that communicates with the UEs and may also be referred to as an evolved Node B (eNB), a base station, an access point, etc. Each Node B provides communication coverage for a particular geographic area. The coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

RNC 130 couples to Node Bs 120 and 122 and provides coordination and control for these Node Bs. RNC 130 may also communicate with network entities within core network 104. Core network 104 may include various network entities that support various functions and services for the UEs.

A UE 110 may communicate with Node B 120 and/or Node B 122 via the downlink and uplink. The downlink (or forward link) refers to the communication link from a Node B to a UE, and the uplink (or reverse link) refers to the communication link from the UE to the Node B. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc.

Figure 2:
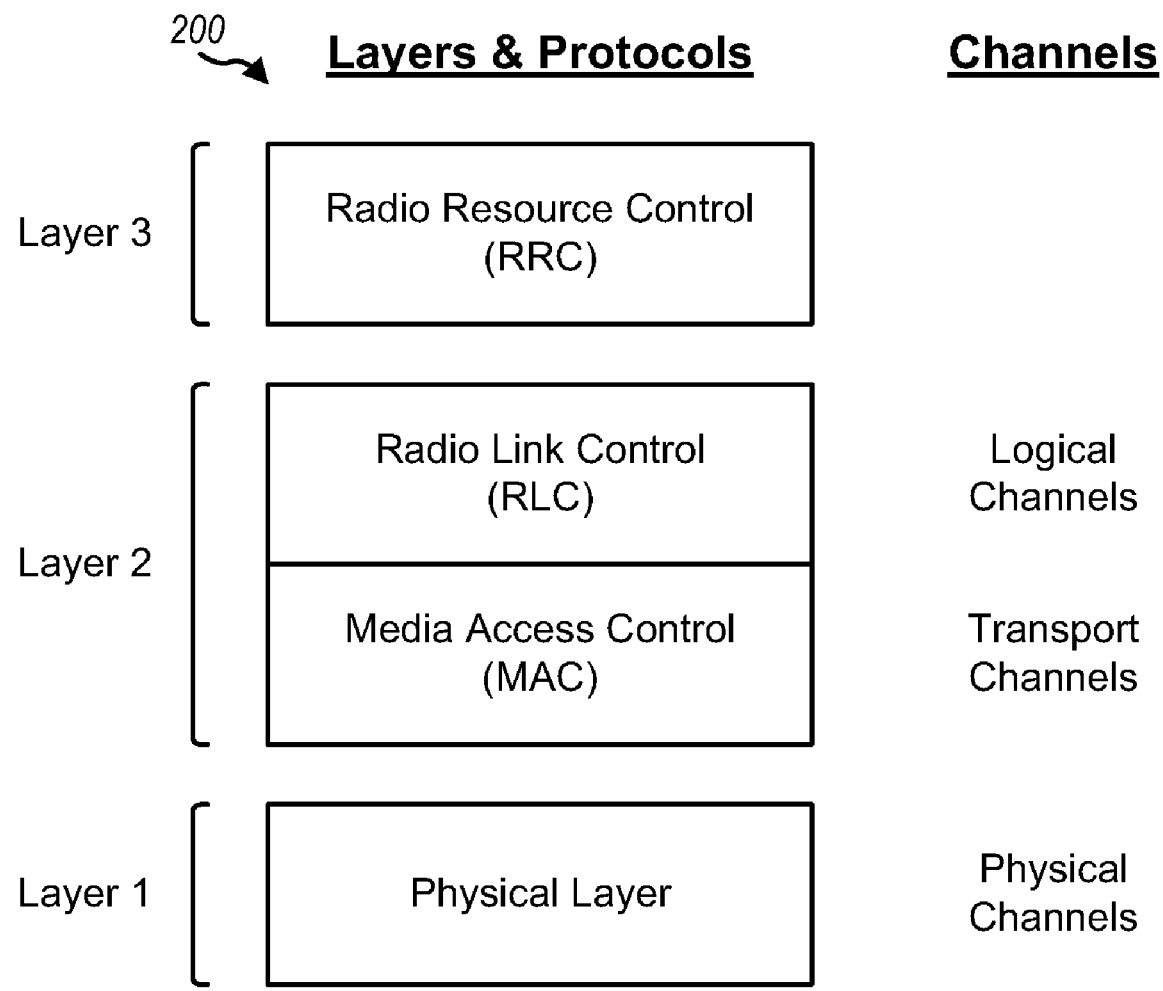
FIG. 2 shows an example protocol stack at a UE for signaling.

FIG. 2 shows an example protocol stack 200 at UE 110 for signaling in WCDMA. Protocol stack 200 includes a network layer (Layer 3), a data link layer (Layer 2), and a physical layer (Layer 1). For signaling, Layer 3 includes Radio Resource Control (RRC), and Layer 2 includes Radio Link Control (RLC) and Medium Access Control (MAC).

RRC provides information transfer service to a Non Access Stratum (NAS), which is a functional layer that supports traffic and signaling messages between the UE and the UTRAN. RRC is also responsible for controlling the configuration of Layers 1 and 2. RLC provides reliability for data transmission and performs automatic retransmission (ARQ) of data. In RLC, data is processed as belonging to logical channels. MAC performs a number of functions such as (i) mapping and/or multiplexing logical channels to transport channels and (ii) processing (e.g., coding, interleaving, and rate matching) of data for each transport channel. The physical layer provides a mechanism for transmitting data from MAC and signaling from higher layers. The physical layer performs a number of functions such as (i) mapping transport channels to physical channels, (ii) processing (e.g., spreading and scrambling) of data for each physical channel, and (iii) power control of each set of physical channels.

On the network side, the physical layer is terminated at the Node Bs, and RRC, RLC and MAC are terminated at the RNC. The various protocols for WCDMA are described in 3GPP TS 25.301, entitled "Radio Interface Protocol Architecture," which is publicly available.

3GPP Release 5 and later supports High-Speed Downlink Packet Access (HSDPA). 3GPP Release 6 and later supports High-Speed Uplink Packet Access (HSUPA). 3GPP Release 7 and later supports High-Speed Packet Access (HSPA+). HSDPA and HSUPA are sets of channels and procedures that enable high-speed packet data transmission on the downlink and uplink, respectively. HSPA+ provides further improvements in both the downlink and uplink.

For HSDPA, a Node B may send data on a High Speed Downlink Shared Channel (HS-DSCH), which is a downlink transport channel that is shared by all UEs in both time and code. The HS-DSCH may carry data for one or more UEs in each transmission time interval (TTI). In WCDMA, a 10 millisecond (ms) radio frame is partitioned into five 2-ms subframes, each subframe includes three slots, and each slot has a duration of 0.667 ms. For HSDPA, a TTI is equal to one subframe and is the smallest unit of time in which a UE might be scheduled and served. The sharing of the HS-DSCH may change dynamically from TTI to TTI.

Table 1 lists some transport channels (denoted as "T") and some physical channels (denoted as "P") in WCDMA and provides a short description for each channel.

TABLE 1

| Channel | Name | Type | Description |
| --- | --- | --- | --- |
| High Speed Downlink Shared Channel | HS-DSCH | T | Carry traffic data and/or signaling for UEs in a shared manner. |
| Dedicated Channel | DCH | T | Carry traffic data and/or signaling for a specific UE. |
| High Speed Physical Downlink Shared Channel | HS-PDSCH | P | Carry data for the HS-DSCH. |
| Dedicated Physical Data Channel | DPDCH | P | Carry data for the DCH. |

Referring back to FIG. 1, UE 110 may initially communicate with Node B 120. UE 110 may be mobile and may be handed over from Node B 120 to Node B 122. For the handover, Node B 120 may be referred to as a source Node B, and Node B 122 may be referred to as a target Node B. After the handover, UE 110 may communicate with Node B 122. Node B 120 may be a serving Node B for UE 110 prior to the handover, and Node B 122 may be the serving Node B after the handover.

Figure 3:
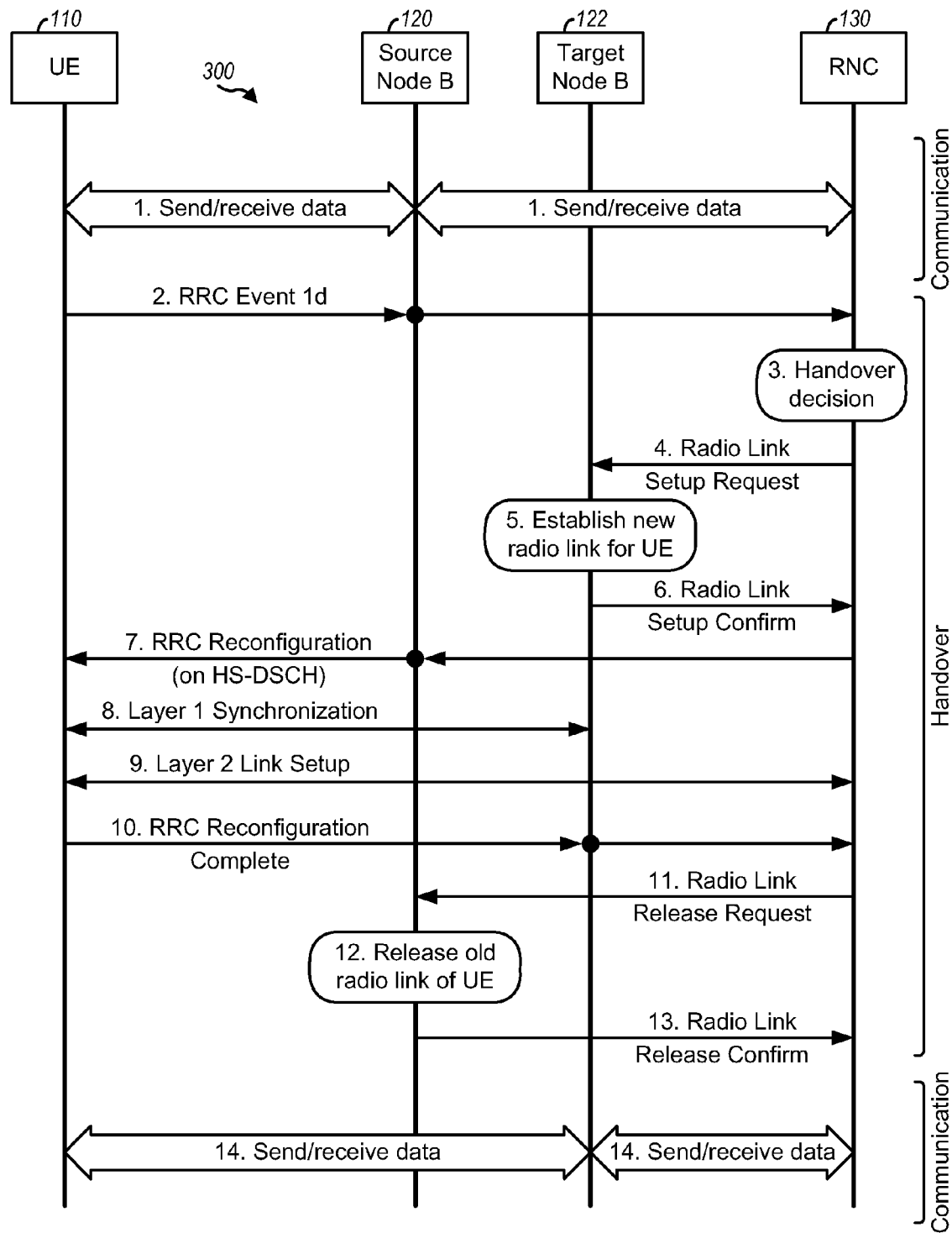
FIG. 3 shows a message flow with signaling messages sent on a shared channel during a call.

FIG. 3 shows an example message flow 300 with signaling messages sent on a shared channel during a call with inter-Node B handover in WCDMA. UE 110 may initially establish a call, which may be for Voice-over-Internet Protocol (VoIP), packet data, etc. UE 110 may communicate with source Node B 120, which may exchange data for the UE with RNC 130 (step 1). UE 110 may periodically measure the signal strength of different cells. UE 110 may determine that the signal strength of source Node B 120 is sufficiently low and that the signal strength of target Node B 122 is sufficiently high. UE 110 may then send an RRC signaling message for Event Id to indicate the detected condition (step 2). UE 110 may send this RRC signaling message to source Node B 120, which may forward the message to RNC 130.

RNC 130 may receive the RRC signaling message from UE 110 and may make a decision to handover UE 110 to target Node B 122 (step 3). RNC 130 may send a Radio Link Setup Request message to target Node B 122 to request setup of a new radio link for UE 110 (step 4). Target Node B 122 may set up the new radio link for UE 110 (step 5), begin transmission and reception on the new radio link, and return a Radio Link Setup Confirm message to RNC 130 (step 6).

RNC 130 may send an RRC Reconfiguration message via source Node B 120 to UE 110 (step 7). This RRC Reconfiguration message may be a Physical Channel Reconfiguration message, a Radio Bearer Reconfiguration message, a Transport Channel Reconfiguration message, etc. The RRC Reconfiguration message may indicate the radio resources to use for the new radio link for the UE.

Upon receiving the RRC Reconfiguration message, UE 110 may terminate reception of the old radio link from source Node B 120. UE 110 may perform Layer 1 synchronization with target Node B 122 (step 8) and may establish Layer 2 link with RNC 130 (step 9). UE 110 may then send an RRC Reconfiguration Complete message to target Node B 122, which may forward the message to RNC 130 (step 10). UE 110 may thereafter communicate with target Node B 122, which may exchange data for the UE with RNC 130 (step 14).

Upon receiving the RRC Reconfiguration Complete message from UE 110, RNC 130 may send a Radio Link Release Request message to source Node B 120 (step 11). Source Node B 120 may release the old radio link for UE 110 (step 12) and may return a Radio Link Release Confirm message to RNC 130 (step 13).

FIG. 3 shows an example message flow for inter-Node B handover in WCDMA. In this message flow, steps 1 and 14 may be for normal communication before and after handover, and steps 2 through 13 may be for handover. Handover may also be performed based on other message flows, which may utilize different sequences of messages. Handover in WCDMA is described in 3GPP TS 25.331, entitled "Radio Resource Control (RRC); Protocol Specification," and in 3GPP TS 25.303, entitled "Interlayer procedures in Connected Mode," both of which are publicly available.

In FIG. 3, UE 110 may communicate with source Node B 120 via HSDPA on the downlink prior to the handover. Source Node B 120 may send the RRC Reconfiguration message as data on the HS-DSCH, which may be sent on the HS-PDSCH. For HSDPA, the HS-PDSCH is sent from only the serving Node B to the recipient UE. During handover, the radio link between the serving Node B and the UE may have deteriorated and may not be reliable. Consequently, the UE may not receive the RRC Reconfiguration message sent on the HS-PDSCH by the serving Node B during handover in step 7. This may result in handover failure and loss of call, which are undesirable.

In an aspect, signaling messages may be sent on a shared channel prior to and after handover and on a dedicated channel during handover. The shared channel may be sent by only the serving Node B, which may result in efficient resource utilization when the radio link may be relatively reliable. The dedicated channel may be sent by multiple Node Bs, e.g., by both the source and target Node Bs during handover. This may result in improved reliably for signaling messages sent during handover. The shared and dedicated channels may be transport channels and may correspond to the HS-DSCH and DCH, respectively, in WCDMA. The shared and dedicated channels may also be physical channels and may correspond to the HS-PDSCH and DPDCH, respectively, in WCDMA. The shared and dedicated channels may also be other channels in other systems.

Figure 4:
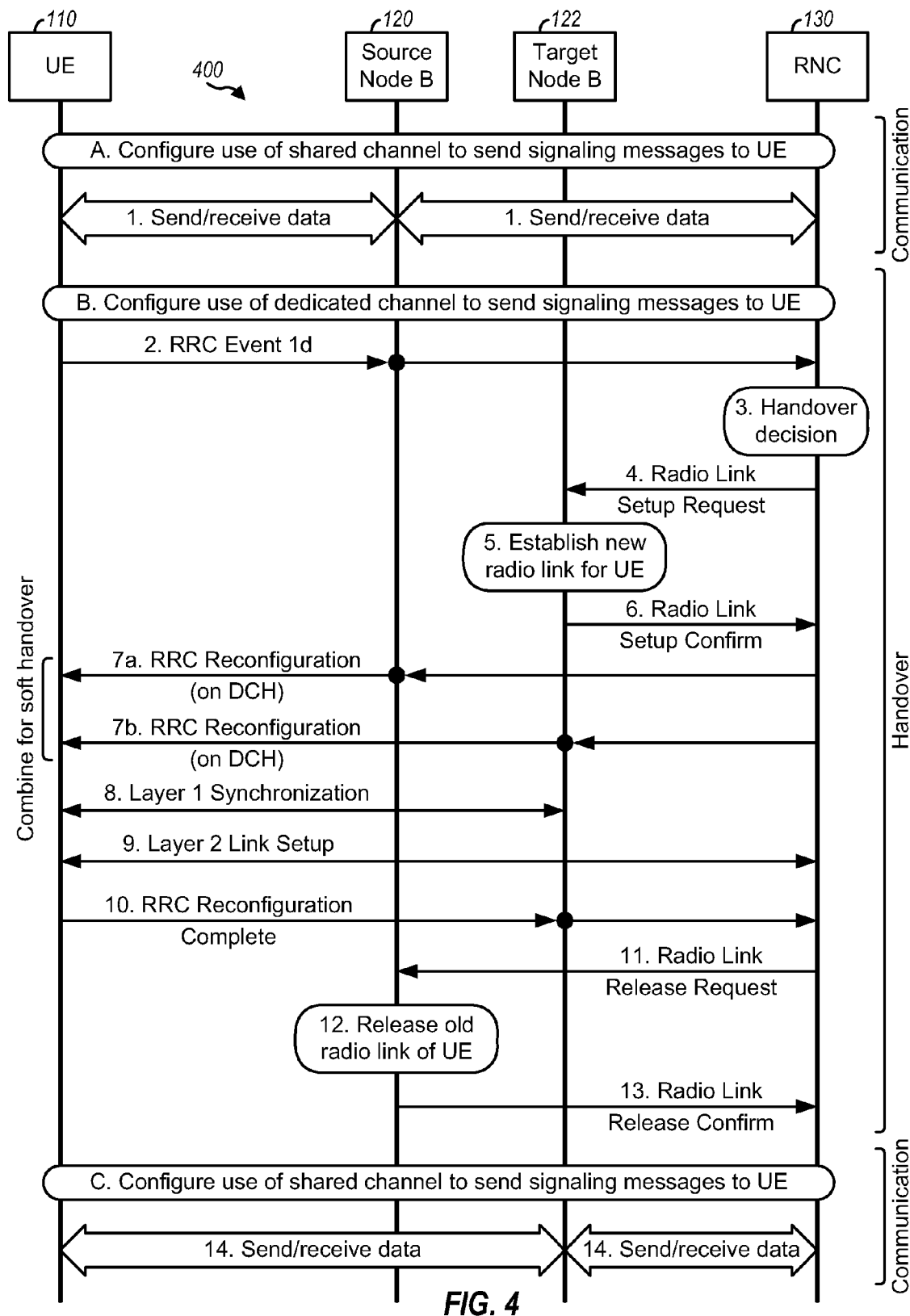
FIG. 4 shows a message flow with signaling messages sent on shared and dedicated channels during a call.

FIG. 4 shows a design of a message flow 400 with signaling messages sent on shared and dedicated channels during a call with inter-Node B handover in WCDMA. Initially, use of a shared channel for RRC signaling messages may be configured for UE 110 (step A). Step A may be performed during call setup at the start of the call and/or may be triggered by an event during the call. After step A and until the channel configuration is changed, RRC signaling messages may be sent on the HS-DSCH and HS-PDSCH by a serving Node B to UE 110. UE 110 may communicate with source Node B 120, which may exchange data for the UE with RNC 130 (step 1).

At some point after step A, use of a dedicated channel for RRC signaling messages may be configured for the UE (step B). Step B may be triggered by an event, as described below. After step B and until the channel configuration is changed, RRC signaling messages may be sent on the DCH and DPDCH by multiple Node Bs to UE 110.

UE 110 may periodically measure the signal strength of different cells. Upon detecting sufficiently low signal strength for source Node B 120 and sufficiently high signal strength for target Node B 122, UE 110 may send an RRC signaling message for Event id via source Node B 120 to RNC 130 (step 2). RNC 130 may make a decision to handover UE 110 to target Node B 122 (step 3) and may send a Radio Link Setup Request message to target Node B 122 (step 4). Target Node B 122 may set up a new radio link for UE 110 (step 5) and may return a Radio Link Setup Confirm message to RNC 130 (step 6).

Since use of the dedicated channel for RRC signaling messages is configured for UE 110, RNC 130 may send an RRC Reconfiguration message to both source Node B 120 and target Node B 122 (steps 7a and 7b). Node Bs 120 and 122 may send the RRC Reconfiguration message on the DCH and DPDCH to UE 110. UE 110 may receive the downlink signals from both Node Bs 120 and 122, process the downlink signal from each Node B to obtain symbols for the DPDCH, and combine the symbols obtained for the DPDCHs for both Node Bs. UE 110 may then process the combined symbols to recover the RRC Reconfiguration message. The RRC Reconfiguration message may thus be sent from multiple Node Bs using soft handover, which may allow UE 110 to combine the downlink transmissions received from these Node Bs. Improved reliably may be obtained for the RRC Reconfiguration message by taking advantage of macro diversity.

Upon receiving the RRC Reconfiguration message from both Node Bs 120 and 122, UE 110 may terminate the old radio link from source Node B 120, perform Layer 1 synchronization with target Node B 122 (step 8), and establish Layer 2 link with RNC 130 (step 9). UE 110 may then send an RRC Reconfiguration Complete message to target Node B 122, which may forward the message to RNC 130 (step 10). RNC 130 may send a Radio Link Release Request message to source Node B 120 (step 11). Source Node B 120 may release the old radio link for UE 110 (step 12) and may return a Radio Link Release Confirm message to RNC 130 (step 13).

At some point after sending the RRC Reconfiguration Complete message, use of the shared channel for RRC signaling messages may be configured for UE 110 (step C). Step C may be triggered by an event, as described below. After step C and until the channel configuration is changed, RRC signaling messages may be sent on the HS-DSCH and HS-PDSCH by the serving Node B to UE 110. UE 110 may also communicate with target Node B 122, which may exchange data for the UE with RNC 130 (step 14).

The use of the shared channel or dedicated channel for signaling messages may be selected or configured by a suitable entity, which may be RNC 130 in WCDMA or an eNB in LTE. In one design, RNC 130 or an equivalent network entity may select the shared channel or dedicated channel for signaling messages. In another design, UE 110 may select the shared channel or dedicated channel for signaling messages. In yet another design, the Node Bs may determine whether to send signaling messages on the shared channel or dedicated channel to the UE.

The use of the shared channel or dedicated channel for signaling messages may be selected in various manners and based on various criteria. In one design, the use of the shared channel or dedicated channel may be selected based on the number of cells in an active set of UE 110. The active set may include one or more cells that can potentially serve the UE for communication. A cell may be added to the active set if its signal strength is above an add threshold and may be removed from the active set if its signal strength is below a drop threshold. HSDPA does not support soft handover on the downlink, and one cell in the active set may be selected as the serving cell for the UE.

In one design, the shared channel may be used to send signaling messages when the active set of the UE contains a single cell. Signaling messages may be sent to the UE via this single cell. The dedicated channel may be used to send signaling messages when the active set contains multiple cells. Signaling messages may be sent to the UE via all cells in the active set, or via a predetermined number of cells (e.g., two strongest cells) in the active set, or via certain selected cells in the active set. In any case, this design may allow the system (i) to take advantage of micro diversity during soft handover when there are multiple cells in the active set and (ii) to switch to more efficient operation when there is only one cell in the active set. A Node B may allocate radio resources for the dedicated channel to the UE when the active set contains multiple cells and may release the radio resources for the dedicated channel when the active set contains one cell.

In another design, the dedicated channel may be used to send signaling messages during handover, and the shared channel may be used to send signaling messages before and after handover. In the message flow shown in FIG. 4, handover may be triggered by the RRC signaling message sent by the UE in step 2. This message may cause the dedicated channel to be configured for the UE. Completion of the handover may be indicated by the RRC Reconfiguration Complete message sent by the UE in step 10. This message may cause the shared channel to be configured for the UE. The RNC may receive RRC signaling messages from the UE and may inform the Node Bs whether to use the shared channel or dedicated channel for the UE.

In yet another design, the use of the shared channel or dedicated channel for signaling messages may be selected based on the types of signaling messages being sent. Certain signaling messages may be deemed to be more important and may be sent on the dedicated channel via multiple Node Bs to obtain greater reliability for these messages. These more important signaling messages may include RRC Reconfiguration messages such as Physical Channel Reconfiguration, Radio Bearer Reconfiguration, and Transport Channel Reconfiguration messages in WCDMA. The remaining signaling messages may be sent on the shared channel via the serving Node B.

In yet another design, the use of the shared channel or dedicated channel for signaling messages may be selected based on the reliability of the shared channel. The shared channel may be used to send signaling messages if it is deemed to be sufficiently reliable, e.g., based on channel quality indicator (CQI) information determined by the UE and reported to the serving Node B. The dedicated channel may be used to send signaling messages if the shared channel is deemed not sufficiently reliable.

Several example designs for selecting the shared channel or dedicated channel for signaling messages have been described above. The use of the shared channel or dedicated channel for signaling messages may also be selected based on other criteria.

The use of the shared channel or dedicated channel for signaling messages may be effectuated in various manners. In one design, the RNC may send messages to the Node Bs and the UE to indicate whether to use the shared channel or dedicated channel for signaling messages. In another design, the Node Bs may determine whether use the shared channel or dedicated channel for signaling messages, e.g., based on any of the channel selection designs described above. The Node Bs may send messages to the UE to indicate whether the shared channel or dedicated channel is used for signaling messages. In yet another design, the UE and Node Bs may separately determine whether to use the shared channel or dedicated channel based on a predetermined channel selection scheme. No messages may be needed to switch between the shared channel and dedicated channel. The use of the shared channel or dedicated channel for signaling messages may also be effectuated in other manners.

In one design, the RNC may send signaling messages (i) to the source Node B when the shared channel is selected for the UE or (ii) to both the source and target Node Bs when the dedicated channel is selected for the UE. In another design, the RNC may send signaling messages to the source Node B, which may forward these signaling messages to other Node Bs if there are multiple cells in the active set of the UE. Signaling messages for the UE may also be routed among the affected network entities in other manners.

At any given moment, the shared channel may be used to send signaling messages to a first group of UEs, and dedicated channels may be used to send signaling messages to a second group of UEs. A given UE may move between the first and second groups based on any of the channel selection designs described above. Improved resource utilization may be achieved for the first group of UEs due to the use of the shared channel. Improved reliability may be achieved for the second group of UEs through macro diversity. The ability to support both groups of UEs concurrently may allow the system to achieve both improved resource utilization when possible and improved reliability when needed.

FIG. 5 shows a design of a process 500 for sending signaling messages in a wireless communication system. Process 500 may be performed by one or more network entities, e.g., by an RNC and/or Node Bs.

A first signaling message may be sent on a shared channel to a UE during a first time period (block 512). A second signaling message may be sent on a dedicated channel to the UE during a second time period following the first time period (block 514). A third signaling message may be sent on the shared channel to the UE during a third time period following the second time period (block 516). Traffic data may be sent on the shared channel to the UE during the first, second and third time periods (block 518). In one design, the first signaling message may be sent via a single Node B to the UE, the second signaling message may be sent via multiple Node Bs to the UE, and the third signaling message may also be sent via a single Node B to the UE. The traffic data may be sent via a single Node B to the UE.

In one design, handover of the UE from a source Node B to a target Node B may be performed during the second time period. The first signaling message may be sent via the source Node B to the UE. The second signaling message may be sent via the source and target Node Bs to the UE. The third signaling message may be sent via the target Node B to the UE. The dedicated channel may be assigned to the UE prior to the handover and may be release after completion of the handover. The shared channel may be used to send signaling messages to the UE after releasing the dedicated channel.

In one design, the shared channel may be used to send signaling messages to the UE when an active set of the UE includes a single cell, and the dedicated channel may be used to send signaling messages to the UE when the active set includes multiple cells. In another design, the shared channel may be used to send signaling messages to the UE prior to and after handover, and the dedicated channel may be used to send signaling messages to the UE during handover. In yet another design, the dedicated channel may be used to send a predetermined set of signaling messages (e.g., reconfiguration messages), and the shared channel may be used to send remaining signaling messages. In yet another design, the shared channel may be used to send signaling messages to the UE when this channel is deemed sufficiently reliable, and the dedicated channel may be used to send signaling messages to the UE when the shared channel is deemed not sufficiently reliable. The shared channel or dedicated channel may also be selected based on other criteria.

For WCDMA, the shared channel may comprise the HS-DSCH and/or HS-PDSCH, and the dedicated channel may comprise the DCH and/or DPDCH. The shared and dedicated channels may also comprise other channels in other systems. For WCDMA, the signaling messages may comprise RRC messages, and the second signaling message may comprise an RRC Reconfiguration message. The signaling messages may also comprise Layer 3 messages and/or other messages in other layers (e.g., Layer 2).

FIG. 6 shows a design of a process 600 for sending signaling messages in a wireless communication system. Process 600 may also be performed by one or more network entities, e.g., by an RNC and/or Node Bs. UEs may be placed in a first group or a second group, e.g., based on their active sets, whether they are in handover, etc. (block 612). In one design, UEs with active sets having a single cell may be placed in the first group, and UEs with active sets having multiple cells may be placed in the second group. In another design, UEs not in handover may be placed in the first group, and UEs in handover may be placed in the second group.

Signaling messages may be sent on a shared channel to the first group of UEs (block 614). A signaling message may be sent on the shared channel via a single Node B to each UE in the first group. Signaling messages may be sent on dedicated channels to the second group of UEs (block 616). A signaling message may be sent on a dedicated channel via multiple Node Bs to each UE in the second group. Traffic data may be sent on the shared channel to the first and second groups of UEs (block 618). As shown in FIG. 6, although signaling messages may be sent on different channels to different UEs, traffic data may be sent on the shared channel to all UEs in the two groups.

Figure 7:
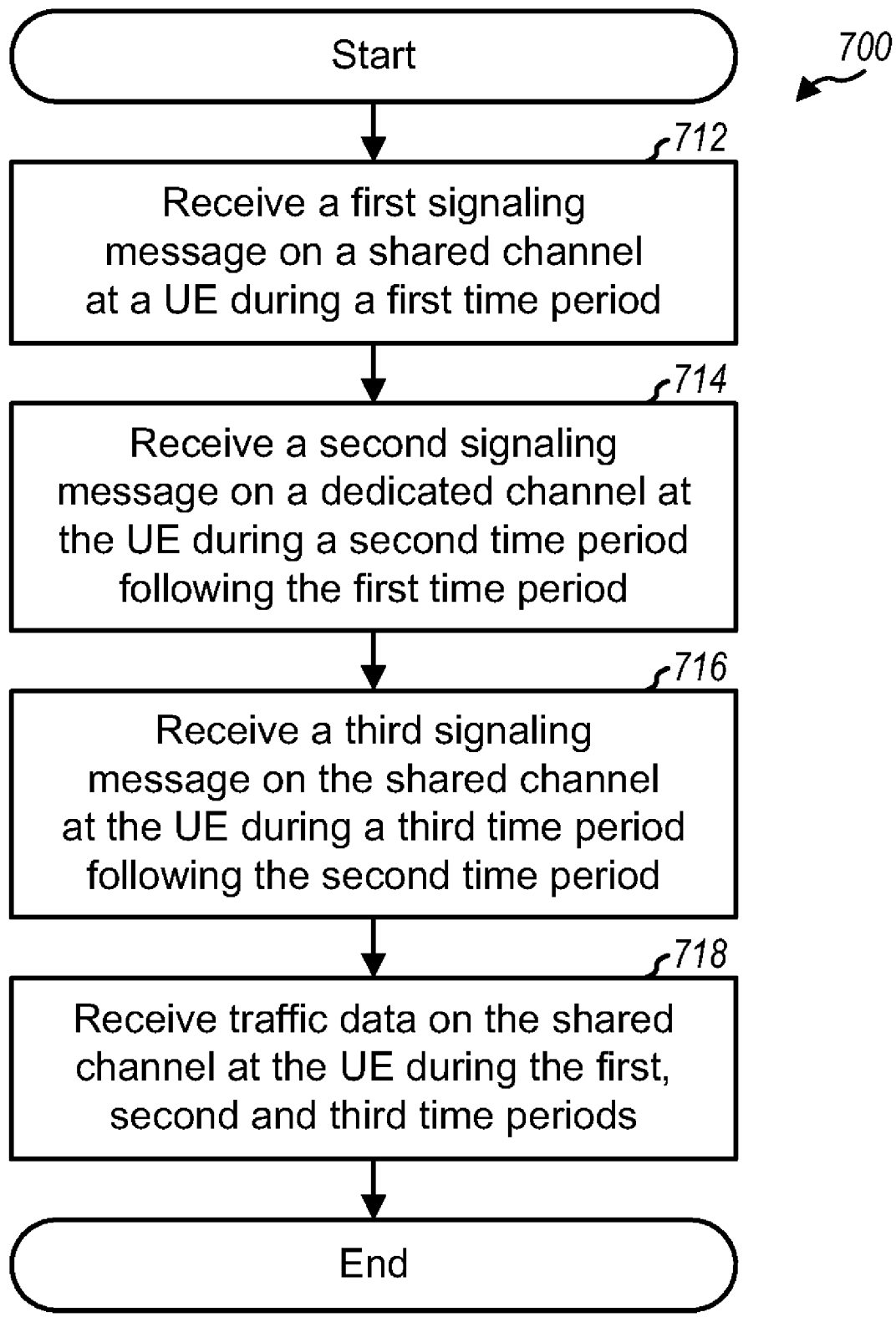
FIG. 7 shows a process for receiving signaling messages by a UE.

FIG. 7 shows a design of a process 700 for receiving signaling messages in a wireless communication system. Process 700 may be performed by a UE. A first signaling message may be received on a shared channel at the UE during a first time period (block 712). A second signaling message may be received on a dedicated channel at the UE during a second time period following the first time period (block 714). A third signaling message may be received on the shared channel at the UE during a third time period following the second time period (block 716). Traffic data may be received on the shared channel at the ULE during the first, second and third time periods (block 718). In one design, the first signaling message may be received via a single Node B, the second signaling message may be received via multiple Node Bs, the third signaling message may be received via a single Node B, and traffic data may be received via a single Node B.

In one design, the UE may perform handover from a source Node B to a target Node B during the second time period. The UE may receive the first signaling message via the source Node B, receive the second signaling message via the source and target Node Bs, and receive the third signaling message via the target Node B. The UE may process and combine the downlink transmissions received from the source and target Node Bs to recover the second signaling message.

Figure 8:
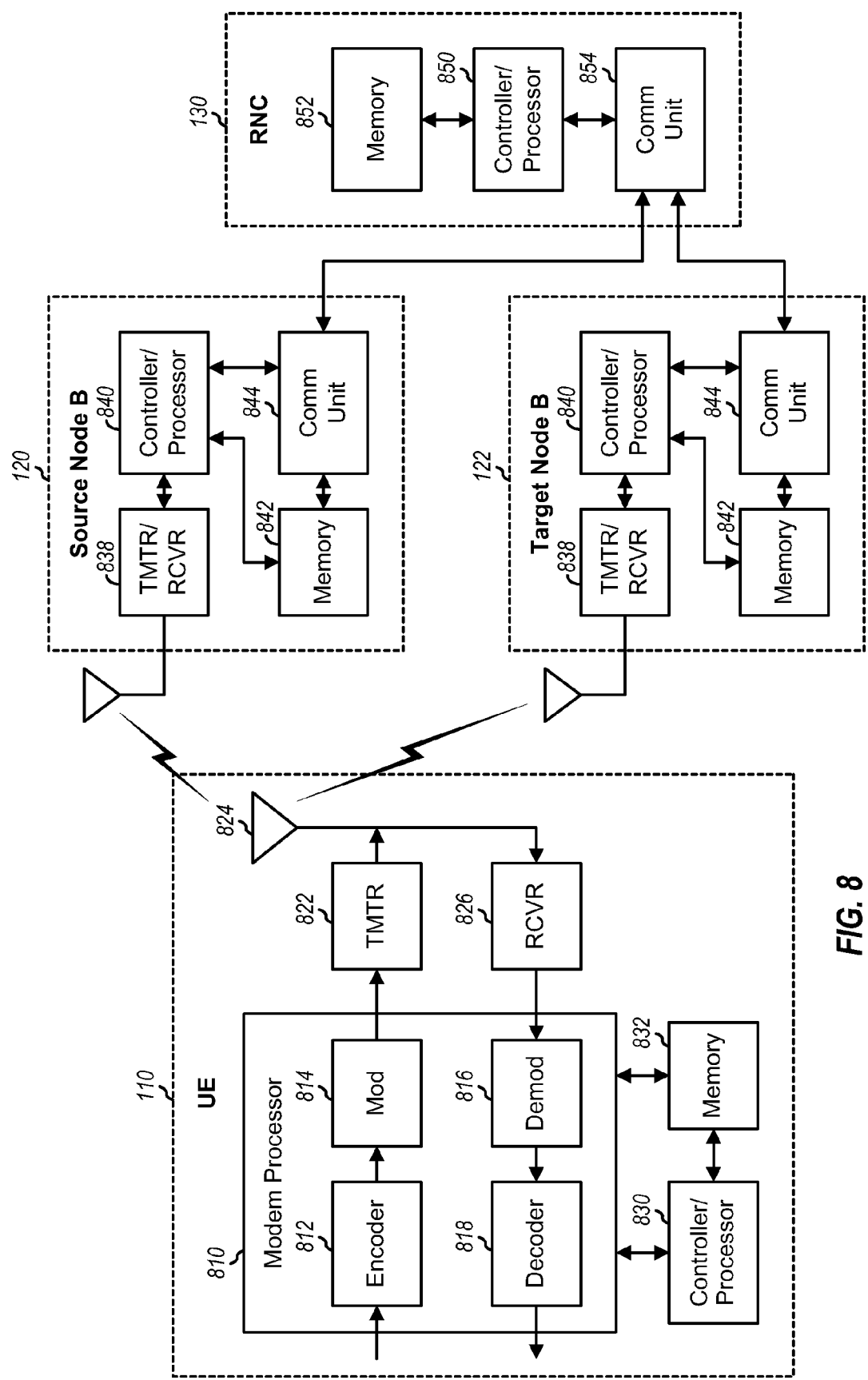
FIG. 8 shows a block diagram of a UE, two Node Bs, and an RNC.

FIG. 8 shows a block diagram of a design of UE 110, Node Bs 120 and 122, and RNC 130 in FIG. 1. On the uplink, an encoder 812 may receive traffic data and signaling messages to be sent by UE 110 on the uplink. Encoder 812 may process (e.g., format, encode, and interleave) the traffic data and signaling messages. A modulator (Mod) 814 may further process (e.g., modulate, channelize, and scramble) the encoded traffic data and signaling messages and provide output chips. A transmitter (TMTR) 822 may condition (e.g., convert to analog, filter, amplify, and frequency upconvert) the output chips and generate an uplink signal, which may be transmitted via an antenna 824 to Node B 120 and/or Node B 122.

On the downlink, antenna 824 may receive downlink signals transmitted by Node B 120 and/or Node B 122. A receiver (RCVR) 826 may condition (e.g., filter, amplify, frequency downconvert, and digitize) the received signal from antenna 824 and provide samples. A demodulator (Demod) 816 may process (e.g., descramble, channelize, and demodulate) the samples and provide symbol estimates. A decoder 818 may process (e.g., deinterleave and decode) the symbol estimates and provide decoded data and signaling messages sent to UE 110. Encoder 812, modulator 814, demodulator 816, and decoder 818 may be implemented by a modem processor 810. These units may perform processing in accordance with the radio technology (e.g., WCDMA, cdma2000, etc.) used by the system. A controller/processor 830 may direct the operation of various units at UE 110. Controller/processor 830 may also perform or direct process 700 in FIG. 7 and/or other processes for the techniques described herein. Memory 832 may store program codes and data for UE 110.

At each Node B, a transmitter/receiver 838 may support radio communication with UE 110 and other UEs. A controller/processor 840 may perform various functions for communication with the UEs. For the uplink, the uplink signal from UE 110 may be received and conditioned by receiver 838 and further processed by controller/processor 840 to recover the traffic data and signaling messages sent by the UE. For the downlink, traffic data and signaling messages may be processed by controller/processor 840 and conditioned by transmitter 838 to generate a downlink signal, which may be transmitted to UE 110 and other UEs. Controller/processor 840 may also perform, direct or participate in process 500 in FIG. 5, process 600 in FIG. 6, and/or other processes for the techniques described herein. Memory 842 may store program codes and data for the Node B. A communication (Comm) unit 844 may support communication with RNC 130 and/or other network entities.

At RNC 130, a controller/processor 850 may perform various functions to support communication services for the UEs. Controller/processor 850 may perform, direct or participate in process 500 in FIG. 5, process 600 in FIG. 6, and/or other processes for the techniques described herein. Memory 852 may store program codes and data for RNC 130. A communication unit 854 may support communication with the Node Bs and other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of sending signaling messages in a wireless communication system, comprising:
   sending a first signaling message on a shared channel to a user equipment (UE) during a first time period;
   sending a second signaling message on a dedicated channel to the UE during a second time period following the first time period;
   sending a third signaling message on the shared channel to the UE during a third time period following the second time period; and
   performing handover of the UE from a source Node B to a target Node B during the second time period, wherein the sending the first signaling message comprises sending the first signaling message via the source Node B to the UE, wherein the sending the second signaling message comprises sending the second signaling message via the source and target Node Bs to the UE, and wherein the sending the third signaling message comprises sending the third signaling message via the target Node B to the UE.

2. The method of claim 1, further comprising:
   sending traffic data on the shared channel to the UE during the first, second and third time periods.

3. The method of claim 1, further comprising:
   sending traffic data via a single Node B to the UE during the first, second and third time periods.

4. The method of claim 1, further comprising:
   assigning the dedicated channel to the UE prior to the handover;
   releasing the dedicated channel after completion of the handover; and
   using the shared channel to send signaling messages to the UE after releasing the dedicated channel.

5. The method of claim 1, wherein the shared channel is used to send signaling messages to the UE when an active set of the UE includes a single cell, and wherein the dedicated channel is used to send signaling messages to the UE when the active set includes multiple cells.

6. The method of claim 1, wherein the shared channel is used to send signaling messages to the UE prior to and after handover of the UE during the second time period, and wherein the dedicated channel is used to send signaling messages to the UE during the handover.

7. The method of claim 1, wherein the dedicated channel is used to send a predetermined set of signaling messages, and wherein the shared channel is used to send remaining signaling messages not in the predetermined set.

8. The method of claim 1, wherein the shared channel is used to send signaling messages to the UE when the shared channel is deemed sufficiently reliable, and wherein the dedicated channel is used to send signaling messages to the UE when the shared channel is deemed not sufficiently reliable.

9. The method of claim 1, wherein the shared channel comprises a High Speed Downlink Shared Channel (HS-DSCH), and wherein the dedicated channel comprises a Dedicated Channel (DCH).

10. The method of claim 1, wherein the second signaling message comprises a Radio Resource Control (RRC) Reconfiguration message.

11. An apparatus for wireless communication, comprising:
at least one processor configured to send a first signaling message on a shared channel to a user equipment (UE) during a first time period, to send a second signaling message on a dedicated channel to the UE during a second time period following the first time period, to send a third signaling message on the shared channel to the UE during a third time period following the second time period, and to perform handover of the UE from a source Node B to a target Node B during the second time period, wherein the first signaling message is sent via the source Node B to the UE, the second signaling message is sent via the source and target Node Bs to the UE, and the third signaling message is sent via the target Node B to the UE.

12. The apparatus of claim 11, wherein the at least one processor is configured to send traffic data on the shared channel to the UE during the first, second and third time periods.

13. The apparatus of claim 11, wherein the at least one processor is configured to send traffic data via a single Node B to the UE during the first, second and third time periods.

14. The apparatus of claim 11, wherein the at least one processor is configured to assign the dedicated channel to the UE prior to the handover, to release the dedicated channel after completion of the handover, and to use the shared channel to send signaling messages to the UE after releasing the dedicated channel.

15. A method of receiving signaling messages in a wireless communication system, comprising:
receiving a first signaling message on a shared channel at a user equipment (UE) during a first time period;
receiving a second signaling message on a dedicated channel at the UE during a second time period following the first time period;
receiving a third signaling message on the shared channel at the UE during a third time period following the second time period; and
performing handover from a source Node B to a target Node B during the second time period, wherein the receiving the first signaling message comprises receiving the first signaling message via the source Node B, wherein the receiving the second signaling message comprises receiving the second signaling message via the source and target Node Bs, and wherein the receiving the third signaling message comprises receiving the third signaling message via the target Node B.

16. The method of claim 15, further comprising:
receiving traffic data on the shared channel at the UE during the first, second and third time periods.

17. The method of claim 15, further comprising:
receiving traffic data via a single Node B during the first, second and third time periods.

18. The method of claim 15, wherein the receiving the second signaling message comprises
receiving first and second transmissions comprising the second signaling message from the source and target Node Bs, respectively,
processing the first and second transmissions to obtain symbols for the source and target Node Bs, respectively,
combining the symbols for the source and target Node Bs, and
processing the combined symbols to recover the second signaling message.

19. An apparatus for wireless communication, comprising:
at least one processor configured to receive a first signaling message on a shared channel at a user equipment (UE) during a first time period, to receive a second signaling message on a dedicated channel at the UE during a second time period following the first time period, to receive a third signaling message on the shared channel at the UE during a third time period following the second time period, and to perform handover from a source Node B to a target Node B during the second time period, wherein the first signaling message is received via the source Node B, the second signaling message is received via the source and target Node Bs, and the third signaling message is received via the target Node B.

20. The apparatus of claim 19, wherein the at least one processor is configured to receive traffic data on the shared channel at the UE during the first, second and third time periods.

21. The apparatus of claim 19, wherein the at least one processor is configured to receive traffic data via a single Node B during the first, second and third time periods.

22. An apparatus for wireless communication, comprising:
means for receiving a first signaling message on a shared channel at a user equipment (UE) during a first time period;
means for receiving a second signaling message on a dedicated channel at the UE during a second time period following the first time period;
means for receiving a third signaling message on the shared channel at the UE during a third time period following the second time period; and
means for performing handover from a source Node B to a target Node B during the second time period, wherein the means for receiving the first signaling message comprises means for receiving the first signaling message via the source Node B, wherein the means for receiving the second signaling message comprises means for receiving the second signaling message via the source and target Node Bs, and wherein the means for receiving the third signaling message comprises means for receiving the third signaling message via the target Node B.

23. The apparatus of claim 22, further comprising: means for receiving traffic data on the shared channel at the UE during the first, second and third time periods.

24. The apparatus of claim 22, further comprising: means for receiving traffic data via a single Node B during the first, second and third time periods.

25. A non-transitory computer-readable medium comprising:
code for causing at least one computer to receive a first signaling message on a shared channel at a user equipment (UE) during a first time period,
code for causing the at least one computer to receive a second signaling message on a dedicated channel at the UE during a second time period following the first time period,
code for causing the at least one computer to receive a third signaling message on the shared channel at the UE during a third time period following the second time period, and
code for causing the at least one computer to perform handover from a source Node B to a target Node B during the second time period, wherein the code for causing the at least one computer to receive the first signaling message comprises code for causing the at least one computer to receive the first signaling message via the source Node B, wherein the code for causing the at least one computer to receive the second signaling message comprises code for causing the at least one computer to receive the second signaling message via the source and target Node Bs, and wherein the code for causing the at least one computer to receive the second signaling message comprises code for causing the at least one computer to receive the third signaling message via the target Node B.

26. An apparatus for wireless communication, comprising:
means for sending a first signaling message on a shared channel to a user equipment (UE) during a first time period;
means for sending a second signaling message on a dedicated channel to the UE during a second time period following the first time period;
means for sending a third signaling message on the shared channel to the UE during a third time period following the second time period; and
means for performing handover of the UE from a source Node B to a target Node B during the second time period, wherein the means for sending the first signaling message comprises means for sending the first signaling message via the source Node B to the UE, wherein the means for sending the second signaling message comprises sending the second signaling message via the source and target Node Bs to the UE, and wherein the means for sending the third signaling message comprises means for sending the third signaling message via the target Node B to the UE.

27. A non-transitory computer-readable medium comprising:
code for causing at least one computer to sending a first signaling message on a shared channel to a user equipment (UE) during a first time period;
code for causing at least one computer to send a second signaling message on a dedicated channel to the UE during a second time period following the first time period;
code for causing at least one computer to send a third signaling message on the shared channel to the UE during a third time period following the second time period; and
code for causing at least one computer to perform handover of the UE from a source Node B to a target Node B during the second time period, wherein the code for causing at least one computer to send the first signaling message comprises code for causing at least one computer to send the first signaling message via the source Node B to the UE, wherein the code for causing at least one computer to send the second signaling message comprises sending the second signaling message via the source and target Node Bs to the UE, and wherein the code for causing at least one computer to send the third signaling message comprises code for causing at least one computer to send the third signaling message via the target Node B to the UE.

* * * * *

UNITED STATES PATENT AND TRADEMARK OFFICE
CERTIFICATE OF CORRECTION

PATENT NO.        : 8,233,452 B2
APPLICATION NO.   : 12/210828
DATED             : July 31, 2012
INVENTOR(S)       : Mahesh Makhinani et al.

It is certified that error appears in the above-identified patent and that said Letters Patent is hereby corrected as shown below:

Title Page:
Item [75]: "Yavuz Mehmet" should be replaced with --Mehmet Yavuz--.

Signed and Sealed this
Twenty-third Day of October, 2012

David J. Kappos
*Director of the United States Patent and Trademark Office*